United States Patent Office 3,531,470
Patented Sept. 29, 1970

3,531,470
α-AMINO-2,4,6-CYCLOHEPTATRIENYL-
METHYLPENICILLINS
Patrick Andrew Diassi, Westfield, Frank Lee Weisenborn, Somerset, and Jack Bernstein, New Brunswick, N.J., assignors to E. R. Squibb & Sons, Inc., New York, N.Y., a corporation of Delaware
No Drawing. Filed May 2, 1969, Ser. No. 821,498
Int. Cl. C07d 99/16
U.S. Cl. 260—239.1
6 Claims

ABSTRACT OF THE DISCLOSURE

This invention relates to α-amino-2,4,6-cycloheptatrienylmethylpenicillins as well as their salts, which are useful as antibacterial agents.

SUMMARY OF THE INVENTION

This invention relates to α-amino - 2,4,6 - cycloheptatrienylmethylpenicillins of the formula (I) 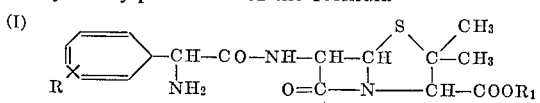

wherein R is hydrogen, halogen or lower alkyl; $R_1$ is hydrogen, lower alkyl or a salt forming ion, e.g., an alkali metal such as sodium or potassium, an alkaline earth metal such as calcium or magnesium or that of an organic base such as dibenzylamine, N,N-dibenzylethylenediamine or the like, and salts thereof.

In Formula I, all four halogens are included by the symbol R, but chlorine and bromine are preferred. The lower alkyl groups represented by R and $R_1$ are straight and branched chain aliphatic hydrocarbon radicals of up to seven carbon atoms, such as methyl, ethyl, propyl, isopropyl, butyl, isobutyl, t-butyl and the like.

DETAILED DESCRIPTION OF THE INVENTION

The new compounds of Formula I may be prepared by coupling an activated form of the amino-2,4,6-cycloheptatrieneacetic acid[2 - (cycloheptatrien-1-yl)glycine] having the formula (II) 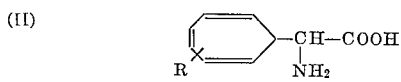

with 6-aminopenicillanic acid (6–APA) having the formula (III) 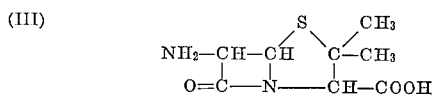

The amino group of the amino-2,4,6-cycloheptatrieneacetic acid is best protected before coupling for an efficient process. Protecting groups which may be used to protect the amino group during the reaction of the acid compound with 6–APA include, for example, triphenylmethyl, t-butoxycarbonyl, β,β,β-trichloroethoxycarbonyl, 4 - oxo - 2 - pentenyl-2, 1-carbomethoxy-1-propenyl-2 or the like. These are formed by reacting the acid of Formula II with a compound such as triphenylmethylchloride, t-butyl azidoformate, β,β,β-trichloroethyl chloroformate, acetylacetone, methyl acetoacetate or the like. After the coupling reaction, the protecting group is removed, e.g., by treatment with aqueous acetic acid, trifluoroacetic acid, zinc-acetic acid, or aqueous mineral acid, respectively to give the compound with the free amino group.

Alternately the amino group may be protected by protonation as the salt form before and during the subsequent coupling reaction.

The coupling is preferably effected by conversion of the acid to an activated form such as the acid chloride, azide, p-nitrophenyl ester or mixed anhydride, or by condensing in the presence of a carbodiimide such as dicyclohexylcarbodiimide.

The starting materials of Formula II may be prepared by the condensation of a tropylium tetrafluoroborate with dimethyl foramidomalonate or dimethyl acetamidomalonate. In those cases in which a substituted tropylium tetrafluoroborate is used, the resultant product usually consists of a mixture of the 2,3 and 4-substituted-2,4,6-cycloheptatrien-1-yl derivatives. This mixture of isomers may be separated after this first reaction, at any subsequent step in the synthesis or the mixture of isomers obtained in the final step may be used as such.

The malonic ester is hydrolyzed to the desired α-aminocycloheptatrien-1-yl-acetic acid. Suitable tropylium tetrafluoroborates for this condensation include, among others, tropylium tetrafluoroborate, chlorotropylium tetrafluoroborate, bromotropylium tetrafluoroborate methyltropylium tetrafluoroborate. Other tropylium tetrafluoroborates are readily prepared from the corresponding substituted tropilidenes, such as isopropyl tropilidene, by a hydride exchange reaction with trityl salts in solvents such as acetonitrile or sulfur dioxide.

The products of this invention form salts which are also part of the invention. Basic salts form with the acid moiety as discussed above in connection with the symbol $R_1$. Acid addition salts also form with the α-amino nitrogen. Such acid salts include, for example, inorganic salts such as the hydrohalides, e.g., hydrobromide, hydrochloride, hydroiodide, sulfate, nitrate, phosphate, borate, etc., and organic salts such as acetate, oxalate, tartrate, malate, citrate, succinate, benzoate, ascorbate, methanesulfonate and the like. It is frequently convenient to isolate and purify the product by forming a soluble or insoluble salt, as desired, then regenerating the free compound, by neutralization, for example.

The preferred compound within the group described by Formula I is that in which both R and $R_1$ are hydrogen.

It will be appreciated that certain of the compounds of this invention exist in different optically active forms. The various stereoisomeric forms are within the scope of this invention.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They may be used as antibacterial agents in a prophylatic manner, e.g., in cleaning or disinfecting compositions, e.g., in aqueous solutions or in inert solid carriers at concentrations of about 0.01 to 1% by weight, or otherwise to combat infections due to organisms such as those named above, and in general may be utilized in a manner similar to penicillin G and other penicillins. For example, a compound of Formula I or a physiologically acceptable salt thereof may be used in various animal species in an amount of about 0.1 to 100 mg./kg./day, orally or parenternally, in single or two to four divided doses to treat infections of bacterial origin. Up to about 600 mg. of a compound of Formula I or a salt thereof may be incorporated in an oral dosage form such as tablets, capsules or elixirs or in an injectable form in a sterile aqueous vehicle prepared according to conventional pharmaceutical practice. In cleaning or disinfecting compositions, e.g., in barns or dairy equipment, a concentration of about 0.01 to 1% by weight of such compounds admixed with, suspended or dissolved in con-

3 ventional inert dry or aqueous carriers for applications by washing or spraying may be used.

The following examples are illustrative of the invention. All temperatures are on the centigrade scale.

GENERAL PROCEDURE (1) Methyl acetoacetate enamine of the 2-(2,4,6-cycloheptatrien-1-yl)glycine sodium salt 2.00 mmoles of the 2-(2,4,6-cycloheptatrien-1-yl)gylcine are dissolved by warming in a solution of 108 mg. of NaOCH$_3$ (2.00 mmoles) in 4.3 ml. reagent grade MeOH. 255 mg. (.24 ml., 2.20 mmoles) methyl acetoacetate is added and the mixture refluxed for 45 minutes. The MeOH is almost totally stripped off in vacuo. 5 ml. benzene is added and distilled off to a small residual volume. The addition and distillation of benzene is repeated to insure complete removal of the MeOH and water. The product crystallizes out overnight from a small residual volume of benzene; the amorphous powder obtained from benzene is quite satisfactory for further use.

(2) α - Amino-α-(2,4,6-cycloheptatrien-1-yl)methylpenicillin 358 mg. 6-aminopenicillanic acid (1.66 mmoles) are stirred well in 2.5 ml. water while 0.23 ml. triethylamine are gradually added with the pH kept under 8.0. Final pH is 7.4; 0.85 ml. acetone are added and the solution kept at −10° C.

The methyl acetoacetate enamine of the 2-(2,4,6-cycloheptatrien-1-yl)glycine sodium salt (1.715 mmoles) is stirred in 4.25 ml. acetone at −20° C. A microdrop of N-methylmorpholine is added followed by the slow addition of 198 mg. of ice cold ethyl chloroformate. Water, 0.43 ml., is added at this point and a turbid solution results. The reaction is stirred for 10 minutes at −20° C.

The turbid solution of mixed anhydride is then added to 6-aminopenicillanic acid. A complete solution is observed. The solution is stirred for 30 minutes at −10° C. It is then raised to room temperature and acidified to pH 2.0 with diluted HCl and, with good stirring, the pH is kept at that level for 10 minutes.

The solution is then extracted with 5 ml. xylene. The aqueous layer is layered with 5 ml. methyl isobutyl ketone and the pH adjusted to 5.0 with 1 N NaOH and chilled overnight. The resulting crystals are filtered off, washed with water, and air dried; alternately, the aqueous layer may be lyophilized, and the product obtained as a mixture with salt may be used directly or purified by crystallization from aqueous alcohol.

EXAMPLE 1

(a) Methyl acetoacetic ester enamine of 2-(2,4,6-cycloheptatrien-1-yl)glycine, sodium salt 330 mg. 2 - (2,4,6 - cycloheptatrien - yl)glycine (2.00 mmoles) are dissolved by warming in a solution of 108 mg. of NaOCH$_3$ (2.00 mmoles) in 4.3 ml. reagent grade MeOH. 255 mg. (.24 ml., 2.20 mmoles) methyl acetoacetate are added and the mixture refluxed for 45 minutes. The MeOH is almost totally stripped off in vacuo. 5 ml. benzene are added and distilled off to a small residual volume. The addition and distillation of benzene is repeated to insure complete removal of the MeOH and water. The product crystallizes out overnight from a small residual colume of benzene. It is filtered off, washed with benzene, and dried in vacuo.

(b) α-Amino-(2,4,6-cycloheptatrien-1-yl)methyl penicillin 358 mg. of 6-aminopenicillanic acid (1.66 mmoles) are stirred well in 2.5 ml. of water while 0.23 ml. triethylamine are gradually added with the pH kept under 8.0. Final pH is 7.4; 0.85 ml. acetone are added and the solution kept at −10° C.

4

489 mg. methyl acetoacetate enamine of 2-(2,4,6-cycloheptatrien-yl)glycine sodium salt (1.715 mmoles) are stirred in 4.25 ml. acetone at −20° C. A microdrop of N-methylmorpholine is added followed by the slow addition of 198 mg. of ice cold ethyl chloroformate. Water, 0.43 ml., is added at this point and a turbid solution results. The reaction mixture is stirred for 10 minutes at −20° C.

The turbid solution of mixed anhydride is then added to the 6-APA solution. A complete solution is observed. The solution is stirred for 30 minutes at −10° C., then raised to room temperature, acidified to pH 2.0 with diluted HCl and, with good stirring, the pH is kept at that level for 10 minutes.

The solution is then extracted with 5 ml. xylene. The aqueous layer is layered with 5 ml. methyl isobutyl ketone and the pH adjusted to 5.0 with 1 N NaOH and chilled overnight. The resulting crystals are filtered off washed with water and air dried.

EXAMPLE 2

(a) Dimethyl α-formamido-(4-methyl-2,4,6-cycloheptatriene)-1-malonate

A solution of 2.3 grams of sodium in 60 ml. of absolute ethanol is added dropwise and with stirring to a finely powdered mixture of 17.5 grams dimethyl formamidomalonate and 19 grams of methyltropylium tetrafluoroborate. To this there is then added 150 ml. of water and the solution is extracted with methylene chloride. The methylene chloride extracts are combined, dried over anhydrous sodium sulfate and then concentrated to yield the desired product.

(b) N-formyl-2-(4-methyl-2,4,6-cycloheptatrien-1-yl)glycine

A solution of 2.77 grams of dimethyl α-formamidomethyl-2,4,6-cycloheptatrien-1-malonate in 60 ml. of methyl alcohol containing 8 grams of sodium hydroxide is allowed to stir overnight at room temperature. The reaction mixture is then concentrated to dryness under reduced pressure and the residue is dissolved in water. The pH of the mixture is adjusted to 5–5.3 by the addition of Dowex-50 (acid form). The mixture is filtered and the filtrate is concentrated under reduced pressure to yield the desired product.

(c) 2-(4-methyl-2,4,6-cycloheptatrien-1-yl)glycine

To a suspension of 3.1 grams of N-formyl-2-(4-methyl-2,4,6-cycloheptatrien-1-yl)glycine in 40 ml. of 3 N hydrochloric acid there is added 25 ml. of dimethylformamide and 10 ml. of methanol. The mixture is heated until a clear solution is obtained, 1 ml. of concentrated hydrochloric acid is added and the solution is stirred overnight at room temperature. The solvent is removed by the addition of n-butanol and concentration under reduced pressure. The dark crystalline residue is dissolved in water and adsorbed on a Dowex-50 (acid form) column. The column is then eluted with 2 N ammonium hydroxide solution and the elutes concentrated to dryness to yield the desired product. This may be further purified by suspension in aqueous methanol and filtration; the desired product being insoluble in this solvent mixture.

(d) α-Amino-(4-methyl-2,4,6-cycloheptatrien-1-yl) methyl penicillin

Following the general procedure and using 2-(4-methylcycloheptatrien-1-yl)glycine as the starting acid, there is obtained the desired α-amino-(4-methyl-2,4,6-cycloheptatrien-1-yl)methylpenicillin.

EXAMPLE 3

α-Amino-(3-chloro-2,4,6-cycloheptatrien-1-yl) methylpenicillin

Following the procedure of Example 2 but substituting an equivalent amount of chlorotropylium tetrafluoroborate for the methyltropylium tetrafluoroborate in part (a), there is obtained the desired α-amino-(3-chloro-2,4,6-cycloheptatrien-1-yl)methylpenicillin.

EXAMPLE 4

α-Amino-(4-bromo-2,4,6-cycloheptatrien-1-yl)methylpenicillin

Following the procedure of Example 2 but substituting an equivalent amount of bromotropylium tetrafluoroborate for the methyltropylium tetrafluoroborate in part (a), there is obtained the desired α-amino-(4-bromo-2,4,6-cycloheptatrien-1-yl)methylpenicillin.

EXAMPLE 5

α-Amino-(2,4,6-cycloheptatrien-1-yl)methylpenicillin, sodium salt

A solution of α-amino-(2,4,6-cycloheptatrien-1-yl)methylpenicillin is obtained by dissolving the penicillin in an equivalent amount of aqueous 0.1 N sodium hydroxide. The solution is filtered and lyophilized to yield the desired α-amino-(2,4,6-cycloheptatrien-1-yl)methylpenicillin, sodium salt.

What is claimed is:

1. A compound of the formula

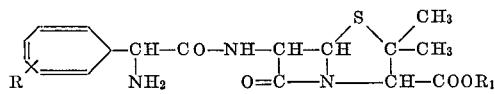

wherein R is hydrogen, halogen or lower alkyl and $R_1$ is hydrogen, lower alkyl or a salt forming ion, and salts thereof.

2. A compound of claim 1 wherein R and $R_1$ each is hydrogen.

3. A compound of claim 1 wherein R is hydrogen and $R_1$ is sodium.

4. A compound of claim 1 wherein R is methyl and $R_1$ is hydrogen.

5. A compound of claim 1 wherein R is chloro and $R_1$ is hydrogen.

6. A compound of claim 1 wherein R is bromo and $R_1$ is hydrogen.

References Cited

UNITED STATES PATENTS 2,985,648   5/1961   Doyle et al. _____ 260—239.1
3,325,478   6/1967   Hermann et al. ____ 260—239.1

NICHOLAS S. RIZZO, Primary Examiner

U.S. Cl. X.R.

424—271